(12) United States Patent
Mitsuoka et al.

(10) Patent No.: US 8,313,680 B2
(45) Date of Patent: Nov. 20, 2012

(54) METHOD OF PRODUCING FUEL CELL

(75) Inventors: Takaaki Mitsuoka, Utsunomiya (JP);
Akihiro Nonogaki, Sakura (JP);
Tetsuhiro Takehara, Utsunomiya (JP);
Masaru Oda, Utsunomiya (JP); Seiji Sugiura, Utsunomiya (JP); Teruyuki Ohtani, Tochigi-ken (JP); Keisuke Ando, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 348 days.

(21) Appl. No.: 12/698,464

(22) Filed: Feb. 2, 2010

(65) Prior Publication Data

US 2010/0203425 A1    Aug. 12, 2010

(30) Foreign Application Priority Data

Feb. 6, 2009   (JP) ................................. 2009-026745

(51) Int. Cl.
*B29C 45/14*    (2006.01)
(52) U.S. Cl. .................... 264/272.21; 264/264
(58) Field of Classification Search .............. 264/263, 264/264, 272.21
See application file for complete search history.

(56) References Cited

U.S. PATENT DOCUMENTS

| | | |
|---|---|---|
| 7,056,614 B2 | 6/2006 | Sugita et al. |
| 2003/0003342 A1 | 1/2003 | Sugita et al. |
| 2003/0143451 A1 | 7/2003 | Andou et al. |
| 2004/0209148 A1 | 10/2004 | Ohara et al. |
| 2005/0118484 A1 | 6/2005 | Kawachi et al. |
| 2005/0271926 A1 | 12/2005 | Sugita et al. |
| 2006/0131819 A1 | 6/2006 | Kurano et al. |

FOREIGN PATENT DOCUMENTS

| | | |
|---|---|---|
| DE | 60220595 T2 | 10/2007 |
| JP | 11-309746 A | 11/1999 |

OTHER PUBLICATIONS

Germany Office Action dated Jun. 24, 2010, issued in corresponding Germany Patent Application No. 102010001638.1.

*Primary Examiner* — Jill Heitbrink
(74) *Attorney, Agent, or Firm* — Westerman, Hattori, Daniels & Adrian, LLP

(57) ABSTRACT

A first separator to which a resin film is joined beforehand is set in a cavity formed between a lower die and an upper die of an injection molding machine. At the time of die locking by moving the upper die toward the lower die, in the case where the total thickness of the resin film and the first separator is larger than a predetermined dimension, the resin film is pressed by the lower die or the upper die, and thus, the resin film is deformed by compression within its elastic deformation range.

4 Claims, 8 Drawing Sheets

METHOD OF PRODUCING FUEL CELL

CROSS-REFERENCE TO RELATED APPLICATION

This application is based upon and claims the benefit of priority from Patent Application No. 2009-026745 filed on Feb. 6, 2009, in the Japan Patent Office, of which the contents are incorporated herein by reference.

BACKGROUND OF THE INVENTION

1. Field of the Invention

The present invention relates to a fuel cell formed by sandwiching a membrane electrode assembly between a pair of separators. The membrane electrode assembly includes an anode, a cathode, and an electrolyte membrane interposed between the anode and the cathode. Further, the present invention relates to a method of producing the fuel cell.

2. Description of the Related Art

A solid polymer electrolyte fuel cell as one type of fuel cell employs a solid polymer electrolyte membrane. The solid polymer electrolyte membrane is a polymer ion exchange membrane. In the solid polymer electrolyte fuel cell of this type, an anode and a cathode each having an electrolyte catalyst layer and a gas diffusion layer are formed on surfaces of the solid polymer electrolyte membrane to form a membrane electrode assembly. The membrane electrode assembly is sandwiched between a pair of separators (bipolar plates) to form a unit cell for generating electricity. In use, typically, a predetermined number of unit cells are stacked together to form a fuel cell stack.

In the fuel cell, a fuel gas flow field for supplying a fuel gas (e.g., hydrogen) is formed on a separator surface facing the anode, and an oxygen-containing gas flow field for supplying an oxygen-containing gas (e.g., air) is formed on a separator surface facing the cathode. Hereinafter, the fuel gas and the oxygen-containing gas may be referred to as a reactant gas. Further, a coolant flow field is formed between the separators for supplying a coolant along the surfaces of the separators for each unit cell, or for every predetermined number of unit cells.

As is known in the art, in operating the fuel cell, the reactant gases and the coolant flow into the flow fields of the fuel cell stack. For this purpose, seals are formed at the edges of both surfaces the separator and near the flow fields of the separator. The seals prevent leakage of the reactant gases and the coolant to the outside of the fuel cell stack.

Additionally, the seals function as insulating coating for preventing corrosion of the separator. That is, the seal is made of insulating material.

As the material for the seal, silicone rubber is used widely. The seal of the silicone rubber of this type may be provided by forming a seal member beforehand, and then, attaching the seal member to the separator. Preferably, as disclosed in Japanese Laid-Open Patent Publication No. 11-309746, the seal is formed by injection molding. In this manner, seals can be provided accurately at predetermined positions of the separator. Stated otherwise, the seals can be positioned with a high degree of accuracy advantageously.

At the time of carrying out the injection molding, as shown in FIG. 8, firstly, a separator 1 is provided at a predetermined position of one molding die 2. In this state, the remaining molding die 3 moves closer to the molding die 2, and thus, so called die locking is carried out. As a result, a cavity 4 is formed. Then, a rubber 5 having fluidity (e.g., melted or liquid substance) is supplied into the cavity 4. When the rubber 5 is hardened, seals are formed on both surfaces at the edges of the separator 1.

In this case, when the separator 1 is thick due to dimensional variation, since the separator 1 blocks the molding die 3, die locking may not be carried out sufficiently. Under the circumstances, as shown in FIG. 8, a very small gap 6 is formed between the molding dies 2, 3. In this state, when the rubber 5 is supplied into the cavity 4, the rubber 5 is filled in the gap 6. The rubber 5 hardened in the gap 6 forms so called burrs 7. When die opening is carried out, the remaining burrs 7 are present in the molding die 2 or the molding die 3. As can be seen from the above, in the case of forming the rubber seals by injection molding, the molding dies 2, 3 may be tainted by the remaining burrs 7 disadvantageously. For this reason, operation of the injection molding machine needs to be stopped each time the stains in the die due to the burrs 7 are removed. Accordingly, the production efficiency is lowered disadvantageously.

In the example shown in FIG. 8, the total amount of the rubber corresponding to the volume of the cavity 4 is supplied by one time injection to form the seals on both surfaces of the separator 1. In this case, the separator 1 may be deformed by the pressure of the rubber having fluidity. In this regard, in another known method, after a seal is formed on one surface of the separator 1 by injection molding, a seal is formed on the other surface of the separator 1 by the second injection molding. However, in this method, though it is possible to suppress deformation of the separator 1, since injection molding needs to be carried out twice, the production efficiency is lowered disadvantageously.

Additionally, the rubber such as a silicone rubber used for the seal is expensive. Therefore, it is desirable to reduce the amount of the rubber used for the seal as much as possible.

SUMMARY OF THE INVENTION

A general object of the present invention is to provide a fuel cell that can be produced efficiently.

A main object of the present invention is to provide a method of producing a fuel cell which makes it possible to form a rubber seal easily.

According to an aspect of the present invention, a fuel cell formed by sandwiching a membrane electrode assembly between a pair of separators is provided. The membrane electrode assembly includes an anode, a cathode, and an electrolyte membrane interposed between the anode and the cathode.

Each of the separators includes a metal plate having a flow field for supplying a gas to the anode or the cathode.

A resin film that is deformable elastically and functions as a seal is provided on one surface of the metal plate, and a rubber seal is provided on the other surface of the metal plate.

The "rubber" of the rubber seal means material having good insulating characteristics and elasticity required as the seal.

Conventionally, rubber seals are formed on both surfaces of the metal plate to form the separator. In this regard, according to the careful study of the inventors of the present application, sealing is achieved by providing a rubber seal on one surface of the separator, and providing a resin film on the other surface of the separator. That is, in the present invention, the rubber seal is formed only on one surface of the metal plate. In this manner, the amount of rubber required for the rubber seal is reduced, and the separator can be produced at low cost.

Further, the resin film can be joined to the metal plate simply by heat welding or using adhesive. Therefore, the separator can be fabricated easily.

According to another aspect of the present invention, a method of producing a fuel cell formed by sandwiching a membrane electrode assembly between a pair of separators is provided. The membrane electrode assembly includes an anode, a cathode, and an electrolyte membrane interposed between the anode and the cathode.

Each of the separators includes a metal plate having a flow field for supplying a gas to the anode or the cathode. The method includes the steps of providing a resin film that is deformable elastically on one surface of the metal plate, and inserting the metal plate having the resin film provided on the one surface into a molding die to provide a rubber seal on the other surface of the metal plate by injection molding.

In the case of the conventional technique of forming rubber seals on both surfaces of the metal plate by injection molding, a rubber seal is formed on each surface. In the technique, as described above, injection molding needs to be carried out twice in order to suppress deformation of the separator. In contrast, according to the present invention, the rubber seal can be formed only by one time injection molding. Therefore, the time required for fabricating the separator is reduced significantly. Thus, improvement in the efficiency of producing the separator, and thus, the fuel cell is achieved.

That is, in the present invention, a resin film is provided on one surface of the metal plate. Therefore, the amount of rubber required for the rubber seal is reduced, and cost reduction is achieved. Further, injection molding for forming the rubber seal needs to be carried out only once without causing deformation of the metal plate (separator). For this reason, it is possible to produce the separator, and thus, the fuel cell efficiently.

Preferably, at the time of the injection molding, the resin film is pressed by the molding die after die locking.

For example, in the case where the total thickness of the resin film and the separator is larger than a design value due to dimensional variation, die locking generates a reaction force against the molding die, since the resin film is pressed by the molding die. By the reaction force, die locking is sufficiently carried out between the resin film and the molding die or between the resin film and the separator.

Thus, no gap is formed between the molding dies. Therefore, at the time of injection molding for forming the rubber seal, the rubber is not filled in the gap, and no burrs are produced.

As described above, at the time of injection molding for forming the rubber seal, the resin film is pressed by the molding die after die locking, and die locking is sufficiently carried out between the resin film and the molding die or between the resin film and the metal plate, and thus, no burrs are produced. Therefore, no remaining burrs are present in the molding die, and it is not necessary to stop operation of the injection molding machine for removal of burrs. Accordingly, further improvement in the efficiency of producing the fuel cell is achieved.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Hereinafter, a fuel cell and a method of producing the fuel cell according to preferred embodiments of the present invention will be described in detail with reference to the accompanying drawings.

Figure 1:
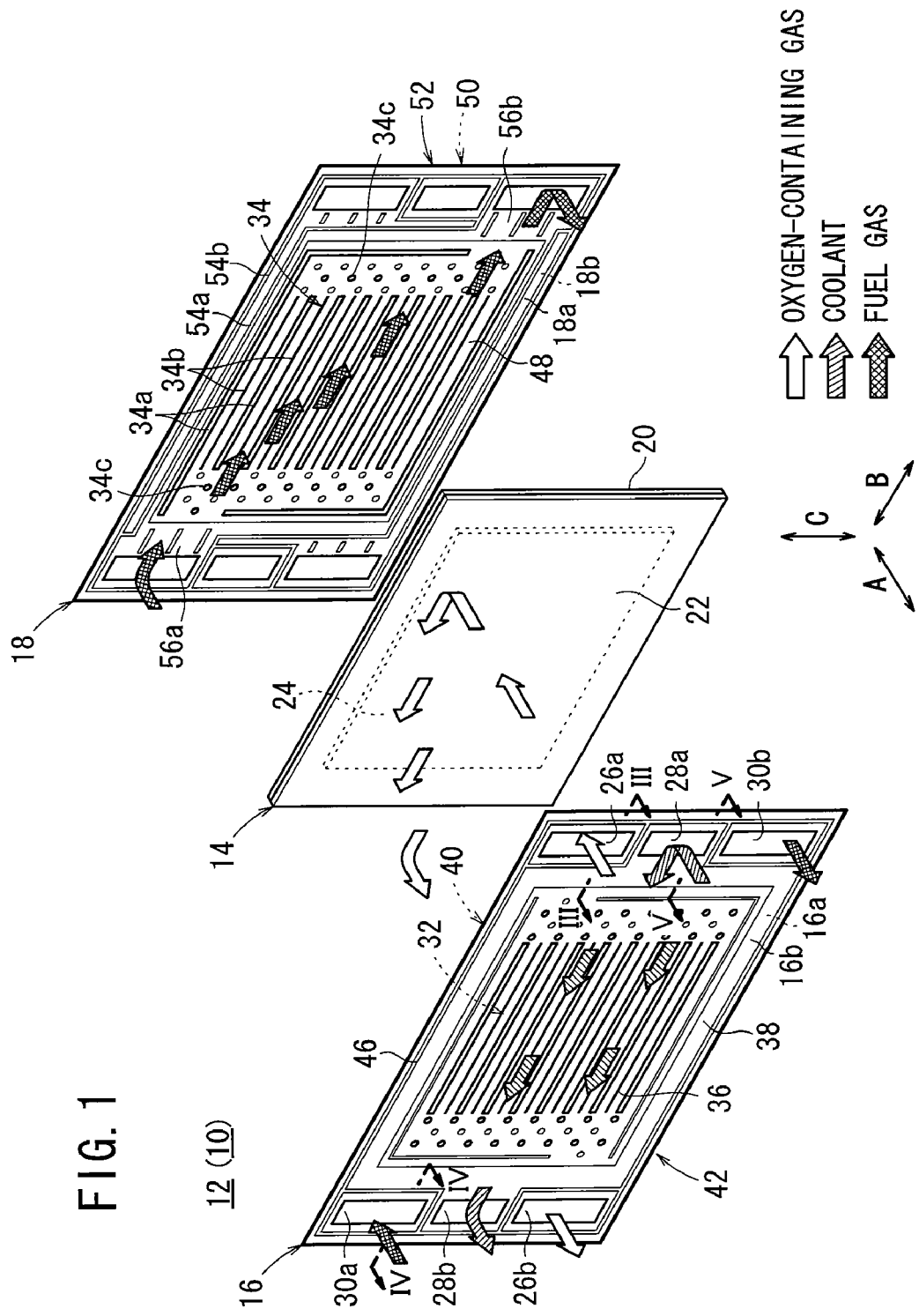
FIG. 1 is an exploded perspective view showing a unit cell of a fuel cell according to an embodiment of the present invention.

FIG. 1 is an exploded perspective view showing a unit cell 12 of a fuel cell 10 according to an embodiment of the present invention. The fuel cell 10 is formed by stacking a plurality of the unit cells 12 in a direction indicated by an arrow A. Each of the unit cells 12 is formed by sandwiching a membrane electrode assembly (electrolyte electrode assembly) 14 between a first separator 16 and a second separator 18.

The membrane electrode assembly 14 includes a cathode 22, an anode 24, and a solid polymer electrolyte membrane (electrolyte) 20 interposed between the cathode 22 and the anode 24. The solid polymer electrolyte membrane 20 is formed by impregnating a thin membrane of perfluorosulfonic acid with water, for example.

Each of the cathode 22 and the anode 24 has a gas diffusion layer (not shown) such as a carbon paper, and an electrode catalyst layer (not shown) of platinum alloy supported on porous carbon particles. The carbon particles are deposited uniformly on the surface of the gas diffusion layer. Since the cathode 22 and the anode 24 have structure known in the art, such structure of the cathode 22 and the anode 24 is not shown in the drawings, and detailed descriptions thereof are omitted. It should be noted that the surface area of the anode 24 is smaller than the surface area of the cathode 22 and the surface area of the solid polymer electrolyte membrane 20.

At one end of the first separator 16 and the second separator 18 in the direction indicated by the arrow B, an oxygen-containing gas supply passage 26a for supplying an oxygen-containing gas, a coolant supply passage 28a for supplying a coolant, and a fuel gas discharge passage 30b for discharging a fuel gas are arranged in a vertical direction indicated by an arrow C. The oxygen-containing gas supply passage 26a, the coolant supply passage 28a, and the fuel gas discharge passage 30b extend through the first separator 16 and the second separator 18 in the stacking direction indicated by the arrow A.

At the other end of the first separator 16 and the second separator 18 in the direction indicated by the arrow B, a fuel gas supply passage 30a for supplying the fuel gas, a coolant discharge passage 28b for discharging the coolant, and an oxygen-containing gas discharge passage 26b for discharging the oxygen-containing gas are arranged in the direction indicated by the arrow C. The fuel gas supply passage 30a, the coolant discharge passage 28b, and the oxygen-containing gas discharge passage 26b extend through the first separator 16 and the second separator 18 in the direction indicated by the arrow A.

Figure 2:
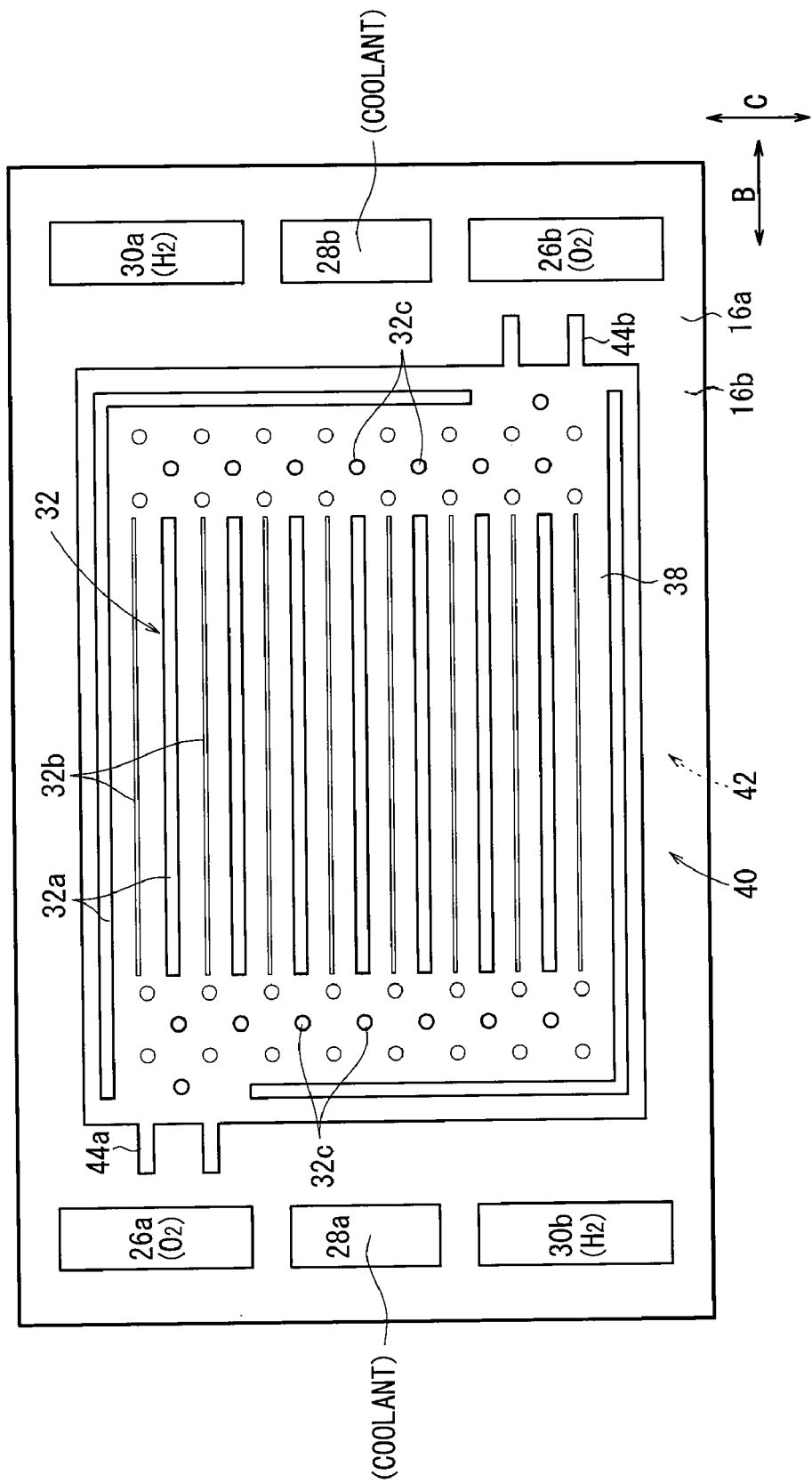
FIG. 2 is a front view showing a first separator of the unit cell.

As shown in FIG. 2, an oxygen-containing gas flow field 32 is formed on a surface 16a of the first separator 16 facing the membrane electrode assembly 14. The oxygen-containing gas flow field 32 is formed in a straight pattern in the direction indicated by the arrow B, by providing ridges 32a and grooves 32b extending in the direction indicated by the arrow B. The ridges 32a protrude from the surface 16a. The ridges 32a and the grooves 32b are formed alternately in the direction indicated by the arrow C. Bosses 32c are formed at both ends of the oxygen-containing gas flow field 32.

As shown in FIG. 1, a fuel gas flow field 34 is formed on a surface 18a of the second separator 18 facing the membrane electrode assembly 14. The fuel gas flow field 34 is formed in a straight pattern in the direction indicated by the arrow B, by providing ridges 34a and grooves 34b extending in the direction indicated by the arrow B. The ridges 34a protrude from the surface 18a. The ridges 34a and the grooves 32b are formed alternately in the direction indicated by the arrow C. Bosses 34c are formed at both ends of the fuel gas flow field 34.

A coolant flow field 36 is formed between a surface 16b of the first separator 16 and a surface 18b of the second separator 18, i.e., on the back surfaces of the corrugated surfaces of the oxygen-containing gas flow field 32 and the fuel gas flow field 34.

Figure 3:
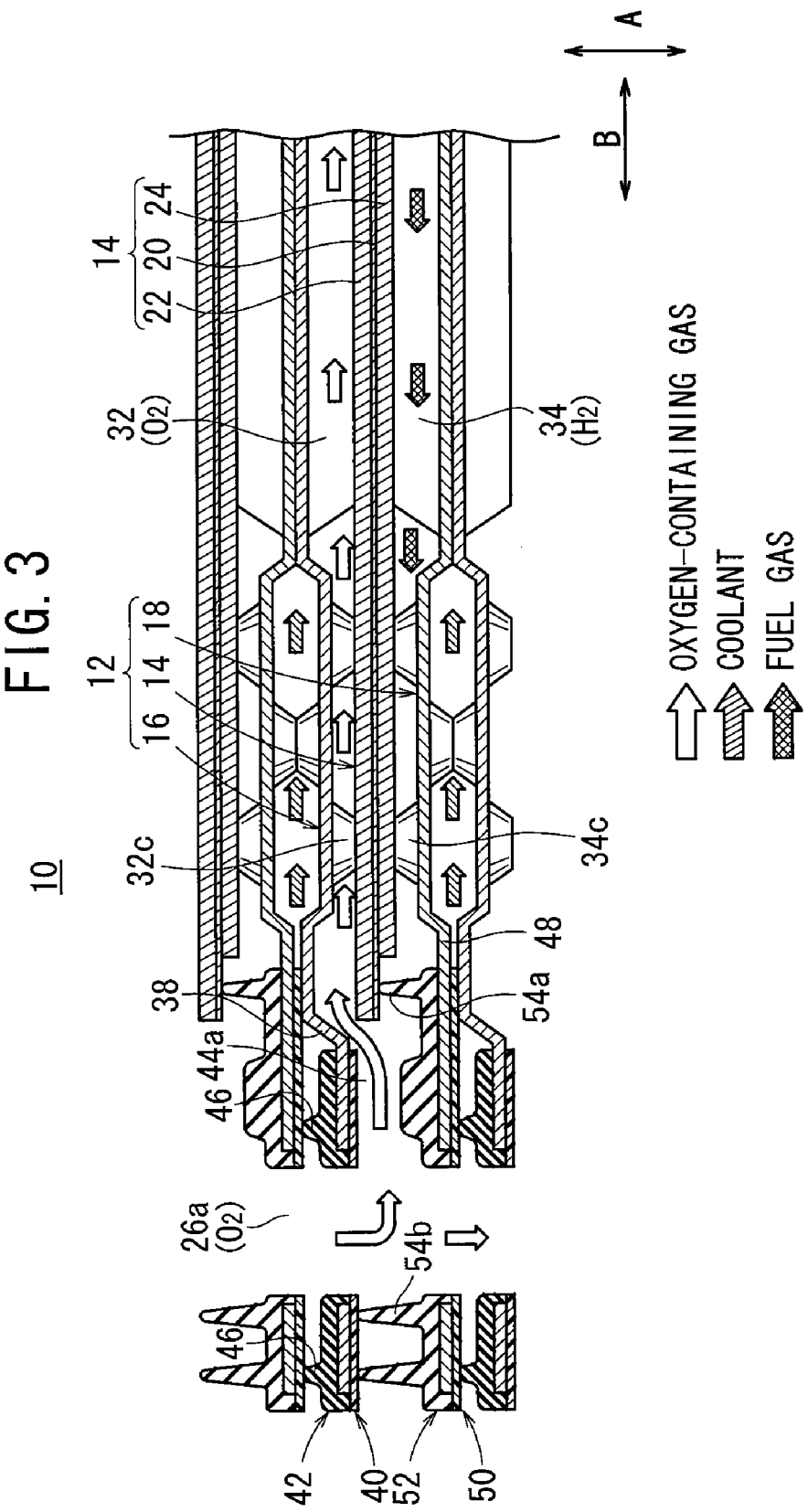
FIG. 3 is a cross sectional view taken along a line in FIG. 1.

As shown in FIGS. 2 and 3, the first separator 16 includes a metal plate 38 formed to have a predetermined shape. A resin film 40 covering the end of the metal plate 38 is provided on one surface (surface 16a side) of the metal plate 38, and a rubber seal 42 is provided on the other surface (surface 16b side) of the metal plate 38.

The resin film 40 is made of soft material having sufficient elasticity, and preferably, has good heat resistance, acid resistance, and steam resistance. As preferable examples of such resin, fluorine resin such as polytetrafluoroethylene (PTFE), engineering plastic such as polyamide (PA), polycarbonate (PC), polyethylene terephthalate (PET), polybutylene terephthalate (PBT), or super engineering plastic such as polyamide-imide (PAI), polyphenylene sulfide (PPS), polyetherimide (PEI), polyethylene naphthalate (PEN), polyetheretherketone (PEEK), or liquid crystal polymer (LCP) may be used. In some cases, general-purpose plastic such as polyethylene (PE) and polypropylene (PP) may be used.

The resin film 40 is joined to one surface 16a of the metal plate 38 (e.g., by heat welding). Thus, the resin film 40 is formed integrally with the metal plate 38. The resin film 40 is made of soft material having sufficient elasticity.

For example, the rubber seal 42 is made of silicone rubber. Other rubbers such as ethylene propylene rubber (EPDM), natural rubber (NBR), fluoro rubber, fluorosilicone rubber, butyl rubber, styrene rubber, chloroprene rubber or acrylic rubber may be used.

As shown in FIG. 2, the resin film 40 is provided on the surface 16a of the first separator 16 around the oxygen-containing gas flow field 32. An inlet channel 44a and an outlet channel 44b pass through the resin film 40, and extend toward the oxygen-containing gas supply passage 26a and the oxygen-containing gas discharge passage 26b, respectively.

As shown in FIG. 1, the rubber seal 42 includes a ridge seal 46 formed around the oxygen-containing gas supply passage 26a, the oxygen-containing gas discharge passage 26b, the fuel gas supply passage 30a, and the fuel gas discharge passage 30b, while allowing the coolant supply passage 28a and the coolant discharge passage 28b to be connected to the coolant flow field 36.

In the first separator 16, the oxygen-containing gas supply passage 26a, the coolant supply passage 28a, the fuel gas discharge passage 30b, the fuel gas supply passage 30a, the coolant discharge passage 28b, and the oxygen-containing gas discharge passage 26b extend through the metal plate 38, the resin film 40, and the rubber seal 42. In this respect, the second separator 18 as described later has the same structure.

The second separator 18 has a metal plate 48 formed to have a predetermined shape. A resin film 50 is formed on one surface 18b of the metal plate 48. A rubber seal 52 is formed on the other surface 18a of the metal plate 48 (see FIGS. 1 and 3). The resin film 50 and the resin film 40 have the same structure, and the rubber seal 52 and the rubber seal 42 have the same structure.

As shown in FIG. 1, the rubber seal 52 includes a first ridge seal 54a formed around the fuel gas flow field 34 for allowing the fuel gas flow field 34 to be connected to the fuel gas supply passage 30a and the fuel gas discharge passage 30b, and a second ridge seal 54b formed around the oxygen-containing gas supply passage 26a, the oxygen-containing gas discharge passage 26b, the coolant supply passage 28a, and the coolant discharge passage 28b for preventing leakage.

An inlet channel 56a is formed between the fuel gas supply passage 30a and the fuel gas flow field 34, and an outlet channel 56b is formed between the fuel gas discharge passage 30b and the fuel gas flow field 34.

A method of producing the fuel cell 10 having the above structure will be described below.

Figure 6:
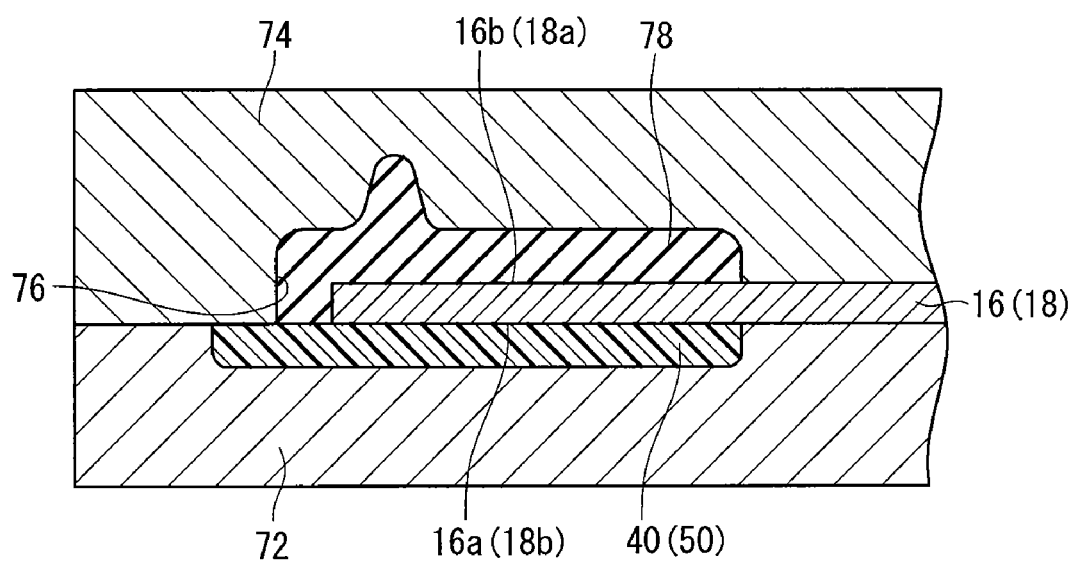
FIG. 6 is a longitudinal sectional view showing main components of an injection molding machine, for illustrating an example of a process of producing the first separator shown in FIG. 2.

FIG. 6 is a longitudinal sectional view showing main components of an injection molding machine 70. The injection molding machine 70 includes a lower die 72 and an upper die 74. A cavity 76 is formed between the lower die 72 and the upper die 74.

The lower die 72 and the upper die 74 have a gate (not shown) for filling a start material (e.g., melted substance or liquid substance) 78 to be formed into the rubber seal 42, the gate communicating with the cavity 76. It is a matter of course that a runner (not shown) is provided near the gate for injecting the start material 78.

In the injection molding machine 70 having the above structure, firstly, the metal plate 38 and the resin film 40 are set in the cavity 76. The resin film 40 is joined to one surface 16a of the metal plate 38 beforehand, e.g., by heat welding. The end of the resin film 40 extends from the cavity 76 toward the outer side of the lower die 72 and the upper die 74 such that the upper die 74 is received by the end of the resin film 40.

Then, die locking is carried out as shown in FIG. 6. At the time of die locking, if the metal plate 38 and the resin film 40 become thick due to dimensional variation, the end of the flexible resin film 40 is pressed from the upper die 74, and a reaction force to the upper die 74 is generated. Therefore, die locking is effected between the upper die 74 and the end of the resin film 40, and no gap is formed between the upper die 74 and the end of the resin film 40.

That is, in this case, since die locking is carried out by pressing the resin film 40 from the upper die 74, no gap is formed between the lower die 72 and the upper die 74. Therefore, it is possible to carry out die locking sufficiently. In the case where the resin film 40 is pressed by the upper die 74, plastic deformation may occur when deformation is beyond the elastic deformation range of resin. Even in this case, die locking is carried out sufficiently.

Then, the start material 78 to be formed into the rubber seal 52 is supplied. The start material 78 is injected into the cavity 76 through the runner and the gate. Preferably, the injection molding should be performed at the injection molding die temperature of 373 to 473 K (100 to 200° C.) and the start material 78 should be injected at the injection pressure of 15 to 100 MPa (150 to 1000 kg/cm$^2$).

After the start material 78 is solidified (hardened), the lower die 72 is moved away from the upper die 74. That is, die opening is carried out. In this manner, the resin film 40 is formed on one surface of the metal plate 38, the rubber seal 42 is formed on the other surface of the metal plate 38, and the first separator 16 is exposed. Thereafter, ends of the resin film 40 exposed from the rubber seal 42 are cut away to form a predetermined shape corresponding to the first separator 16.

Figure 7:
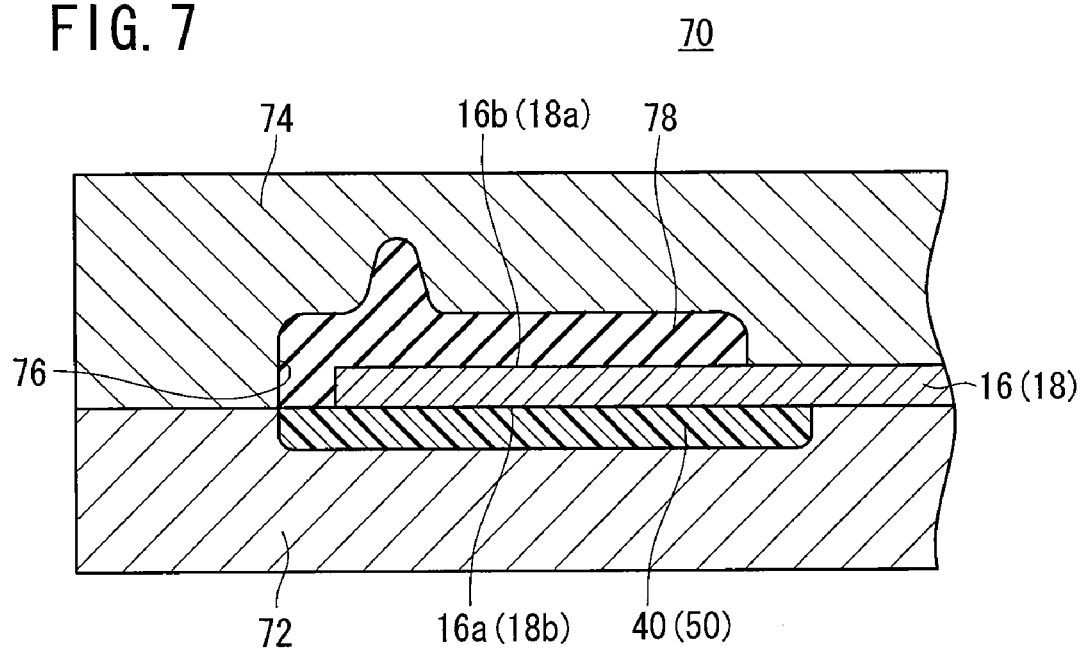
FIG. 7 is a longitudinal sectional view showing main components of an injection molding machine, for illustrating another example of the process of producing the first separator.
Figure 8:
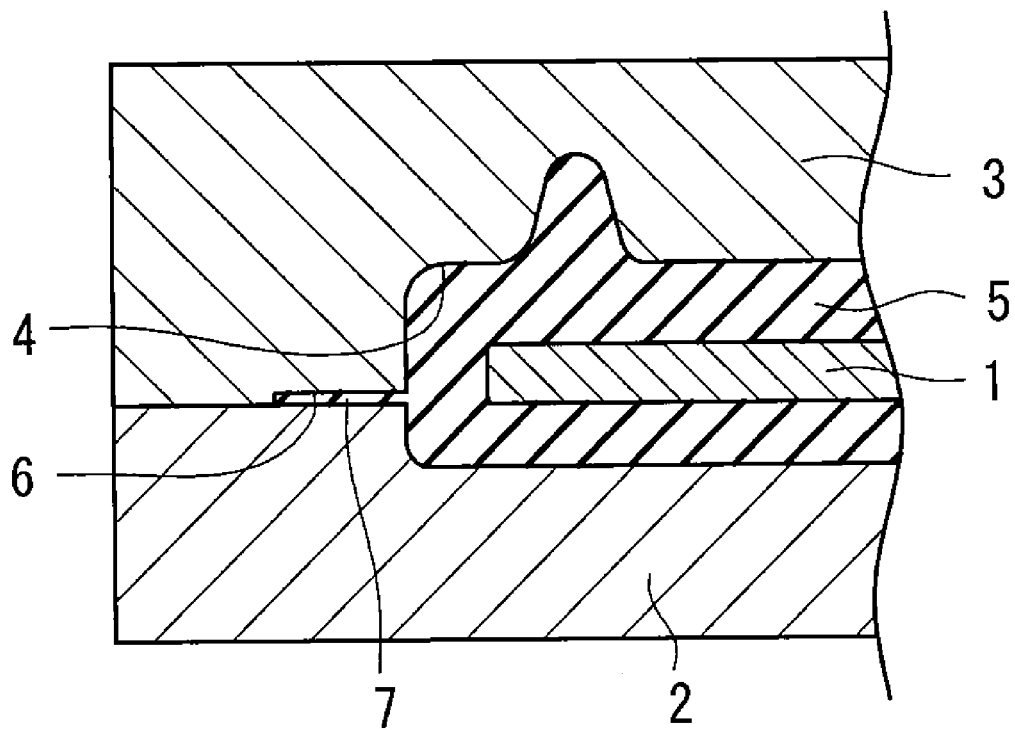
FIG. 8 is a longitudinal cross sectional view showing main components of an injection molding machine for producing a conventional separator.

FIG. 7 shows pressing in another embodiment. Specifically, in the embodiment shown in FIG. 6, the end of the resin film 40 extends outwardly to receive the upper die 74. However, in the embodiment shown in FIG. 7, the resin film 40 extends from the cavity 76 toward the inner side of the lower die 72 and the upper die 74. In this case, when the metal plate 38 and the resin film 40 become thick due to dimensional variation, the inner end of the upper die 74 presses the extended portion of the resin film 40 through the metal plate 38. That is, the extended portion of the resin film 40 is compressed to become thin, and die locking is carried out. Therefore, also in this case, die locking is performed without any gap between the lower die 72 and the upper die 74.

As described above, in the embodiments of the present invention, the gap is not formed between the lower die 72 and the upper die 74 easily. Therefore, the start material 78 is not filled in the clearance, and for this reason, no remaining burrs are present. Thus, it is not necessary to stop operation of the injection molding machine 70 for deburring. Accordingly, improvement in the efficiency of operating the injection molding machine 70 is achieved, and improvement in the efficiency of producing the first separator 16, and the fuel cell 10 is achieved.

Further, in the case where rubber seals are provided on both surfaces of the metal plate by injection molding, in order to suppress deformation of the metal plate, it is necessary to carry out the first injection molding for providing a rubber seal on one surface of the metal plate, and then carry out the second injection molding for providing a rubber seal on the remaining other surface of the metal plate. However, in the embodiments of the present invention, at the time of producing the first separator 16, the rubber seal 42 is formed only on one surface of the metal plate 38. Therefore, for this reason, it is sufficient to carry out injection molding only once.

Further, in the embodiments of the present invention, the amount of rubber seal is reduced. For this reason, the fuel cell can be produced at low cost.

As described above, since no remaining burrs are present, improvement in the efficiency of operating the injection molding machine 70 is achieved, and the number of times of injection molding is reduced. Therefore, it becomes possible to produce the first separator 16, and the fuel cell 10 efficiently. Further, since the amount of the rubber seal is reduced, the fuel cell can be produced at low cost.

It is a matter of course that the second separator 18 can be obtained in the same manner.

The fuel cell 10 obtained as described above can be operated in the following manner.

As shown in FIG. 1, an oxygen-containing gas such as the air is supplied into the oxygen-containing gas supply passage 26*a*, and a fuel gas such as hydrogen is supplied into the fuel gas supply passage 30*a*. Further, a coolant such as pure water or ethylene glycol is supplied to the coolant supply passage 28*a*.

As shown in FIG. 3, the oxygen-containing gas supplied to the oxygen-containing gas supply passage 26*a* flows through the inlet channel 44*a* provided in the first separator 16, and then, the oxygen-containing gas is supplied to the oxygen-containing gas flow field 32. After the oxygen-containing gas flows along the oxygen-containing gas flow field 32 in the direction indicated by the arrow B, the oxygen-containing gas is discharged from the outlet channel 44*b* to the oxygen-containing gas discharge passage 26*b* (see FIG. 1).

Figure 4:
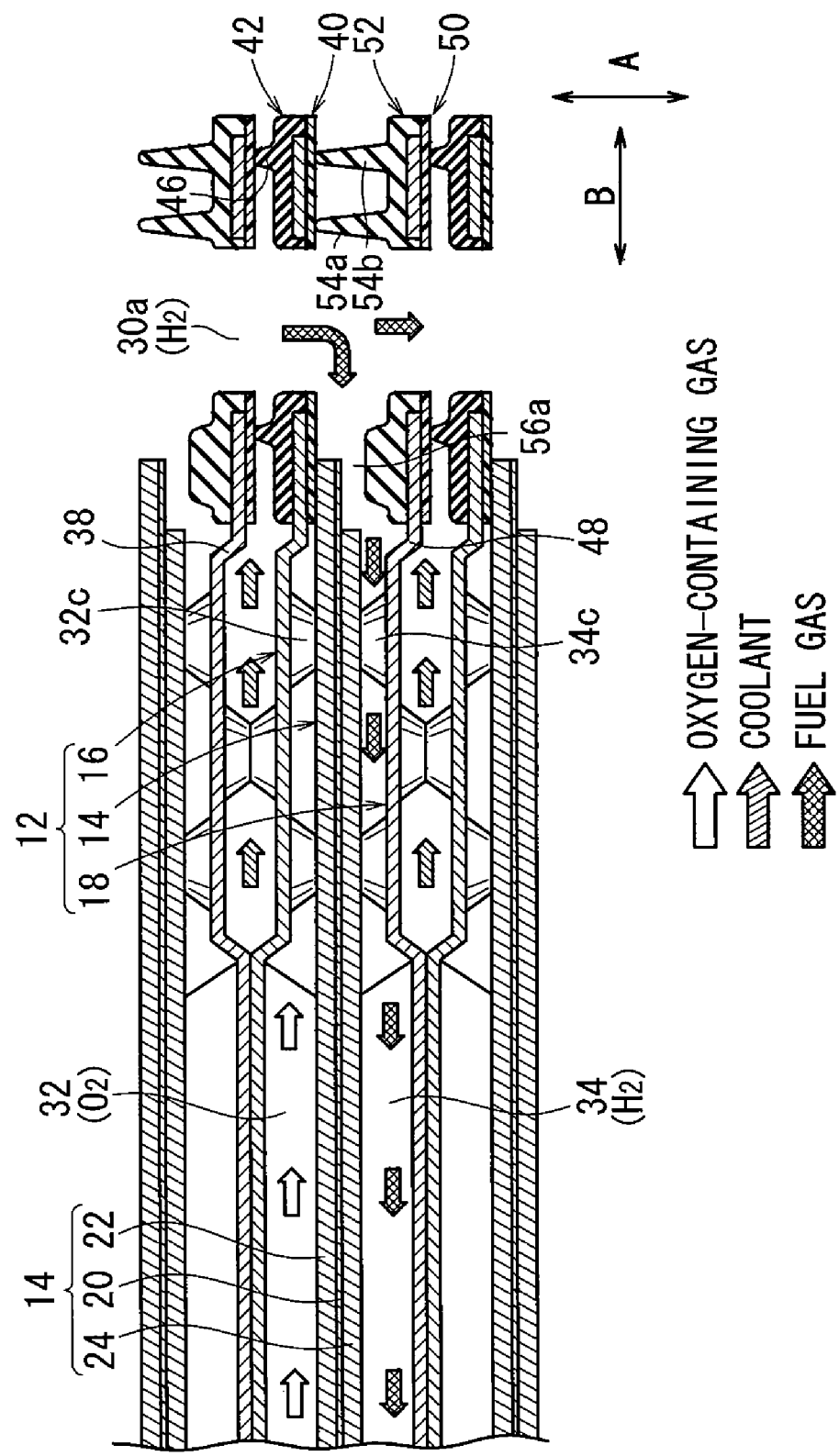
FIG. 4 is a cross sectional view taken along a line IV-IV in FIG. 1.

As shown in FIG. 4, the fuel gas supplied to the fuel gas supply passage 30*a* flows through the inlet channel 56*a* provided in the second separator 18, and the fuel gas is supplied to the fuel gas flow field 34. The fuel gas flows along the fuel gas flow field 34 in the direction indicated by the arrow B, and then, the fuel gas is discharged from the outlet channel 56*b* to the fuel gas discharge passage 30*b* (see FIG. 1).

Thus, in the membrane electrode assembly 14, the oxygen-containing gas supplied to the cathode 22 and the fuel gas supplied to the anode 24 are consumed in the electrochemical reactions at the catalyst layers of the cathode 22 and the anode 24 for generating electricity.

Figure 5:
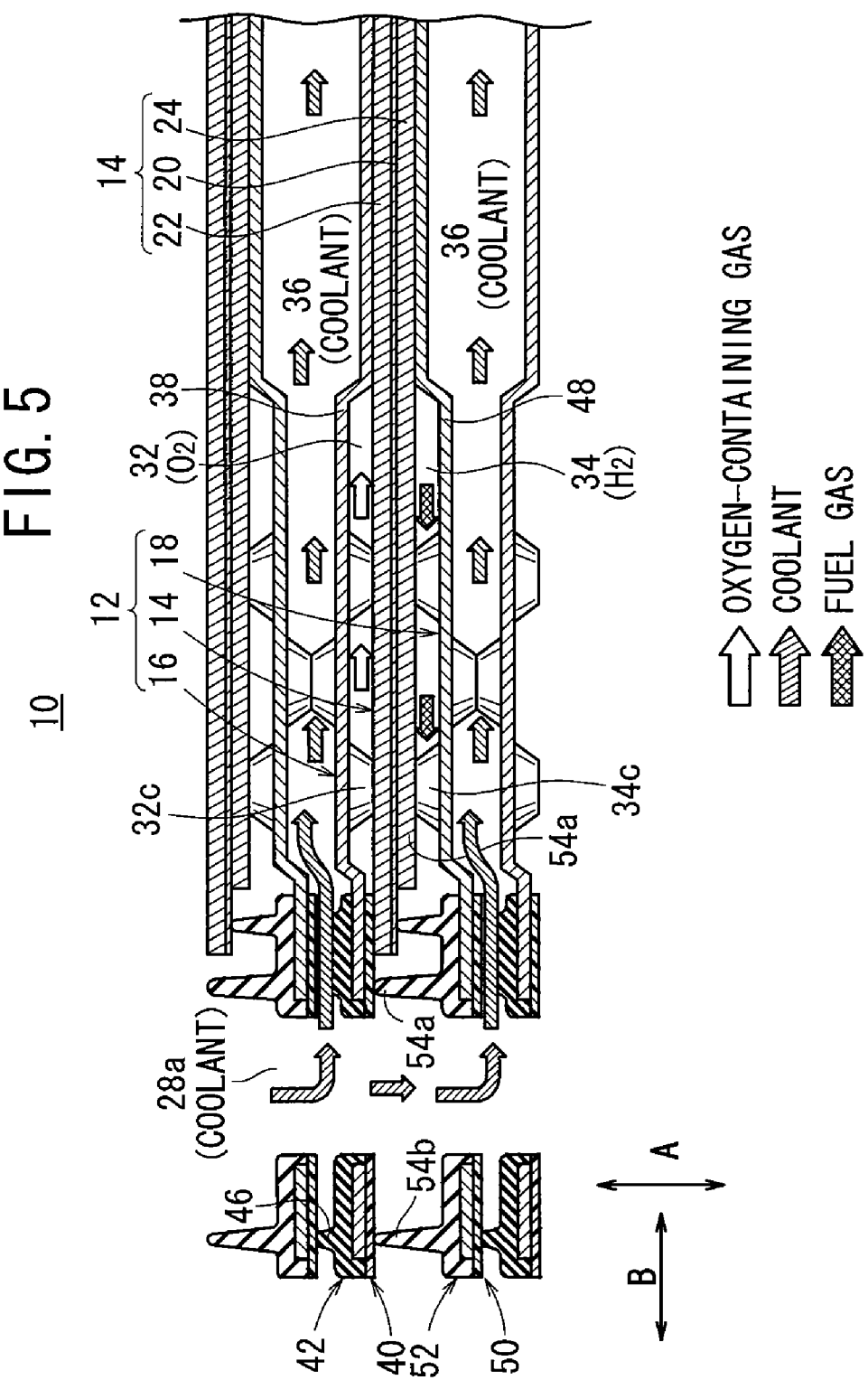
FIG. 5 is a cross sectional view taken along a line V-V in FIG. 1.

Further, the coolant supplied to the coolant supply passage 28*a* flows into the coolant flow field 36 between the first separator 16 and the second separator 18 (see FIG. 5). In the structure, the coolant moves in the direction indicated by the arrow B to cool the membrane electrode assembly 14, and then, the coolant is discharged into the coolant discharge passage 28*b* (see FIG. 1).

In the embodiments described above, the resin film 40 is formed on the surface 16*a* of the first separator 16, and the resin film 50 is formed on the surface 18*b* of the second separator 18. Alternatively, the resin film 40 may be formed on the surface 16*b* of the first separator 16, and the resin film 50 may be formed on the surface 18*a* of the second separator 18. Further, the resin films 40, 50 may be formed on the surfaces 16*a*, 18*a* of the first separator 16 and the second separator 18, respectively, and the resin films 40, 50 may be formed on the surfaces 16*b*, 18*b* of the first separator 16 and the second separator 18, respectively.

While the invention has been particularly shown and described with reference to the preferred embodiments, it will be understood that variations and modifications can be effected thereto by those skilled in the art without departing from the spirit of the invention as defined by the appended claims.

What is claimed is:

1. A method of producing a fuel cell formed by sandwiching a membrane electrode assembly between a pair of separators, the membrane electrode assembly including an anode, a cathode, and an electrolyte membrane interposed between the anode and the cathode, the separators each including a metal plate having a flow field for supplying a gas to the anode or the cathode; the method comprising the steps of:

joining a flat surface of an elastically deformable resin film to only one surface of the metal plate by heat welding;

inserting the metal plate having the resin film joined only to the one surface between upper and lower dies, and forming a rubber seal on at least a surface of the metal plate opposite the one surface, by injection molding, wherein an end of the resin film extends from a cavity for the rubber seal toward an outer or inner side of the lower die such that an upper die is received by the end of the resin film while the upper die presses the end of the resin film at the time of injection molding.

2. The method of producing a fuel cell according to claim 1, wherein the resin film is made of polytetrafluoroethylene, polyamide, polycarbonate, polyethylene terephthalate, polybutylene terephthalate, polyamide-imide, polyphenylene sulfide, polyether-imide, polyethylene naphthalate, polyetheretherketone, liquid crystal polymer, polyethylene, or polypropylene.

3. The method of producing a fuel cell according to claim 1, wherein the rubber seal is made of silicone rubber, ethylene propylene rubber, natural rubber, fluoro rubber, fluorosilicone rubber, butyl rubber, styrene rubber, chloroprene rubber or acrylic rubber.

4. The method of producing a fuel cell according to claim 1, wherein the resin film is fit inside the lower die such that an upper surface of the resin film is flush with an upper surface of the lower die.

* * * * *